(12) United States Patent
Son

(10) Patent No.: US 11,686,509 B2
(45) Date of Patent: Jun. 27, 2023

(54) MAGNETIC COOLING SYSTEM

(71) Applicant: LG ELECTRONICS INC., Seoul (KR)

(72) Inventor: Changwoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 16/766,995

(22) PCT Filed: Nov. 8, 2018

(86) PCT No.: PCT/KR2018/013578
§ 371 (c)(1),
(2) Date: May 26, 2020

(87) PCT Pub. No.: WO2019/107787
PCT Pub. Date: Jun. 6, 2019

(65) Prior Publication Data
US 2020/0393169 A1  Dec. 17, 2020

(30) Foreign Application Priority Data

Nov. 28, 2017 (KR) .................. 10-2017-0160083

(51) Int. Cl.
*F25B 21/00* (2006.01)

(52) U.S. Cl.
CPC ...... *F25B 21/00* (2013.01); *F25B 2321/0022* (2013.01)

(58) Field of Classification Search
CPC ... F25B 21/00; F25B 2321/0022; Y02B 30/00
See application file for complete search history.

(56) References Cited

U.S. PATENT DOCUMENTS

| 2011/0061399 A1 | 3/2011 | Chang et al. |
| 2013/0327062 A1 | 12/2013 | Watanabe et al. |
| 2022/0099366 A1* | 3/2022 | Holladay ................. F25J 1/001 |

FOREIGN PATENT DOCUMENTS

| EP | 2894418 A1 | 7/2015 |
| JP | 2012002388 A | 1/2012 |

(Continued)

*Primary Examiner* — Ana M Vazquez
(74) *Attorney, Agent, or Firm* — Dentons US LLP

(57) ABSTRACT

The present disclosure relates to a magnetic cooling system and provides a magnetic cooling system including: a magnetocaloric material for generating and emitting heat when a magnetic field is applied thereto, and absorbing heat when the magnetic field is removed therefrom; a magnetic heat exchanger containing the magnetocaloric material therein; a heat transfer fluid for heat-exchanging with the magnetocaloric material while flowing inside the magnetic heat exchanger, a magnetic field applying part including a first magnetic field applying part and a second magnetic field applying part, which are installed to have the magnetic heat exchanger disposed therebetween; and a driving part for moving one of the first magnetic field applying part and the second magnetic field applying part, where, as the driving part moves one of the first magnetic field applying part and the second magnetic field applying part, the attraction force between the first magnetic field applying part and the second magnetic field applying part causes synchronous movement of the other thereof.

17 Claims, 7 Drawing Sheets

(56) References Cited

FOREIGN PATENT DOCUMENTS

| | | | |
|---|---|---|---|
| JP | 2012505364 | A | 3/2012 |
| JP | 2013253725 | A | 12/2013 |
| KR | 1020140145232 | A | 12/2014 |
| KR | 1020150005158 | A | 1/2015 |

* cited by examiner

[Figure 1]
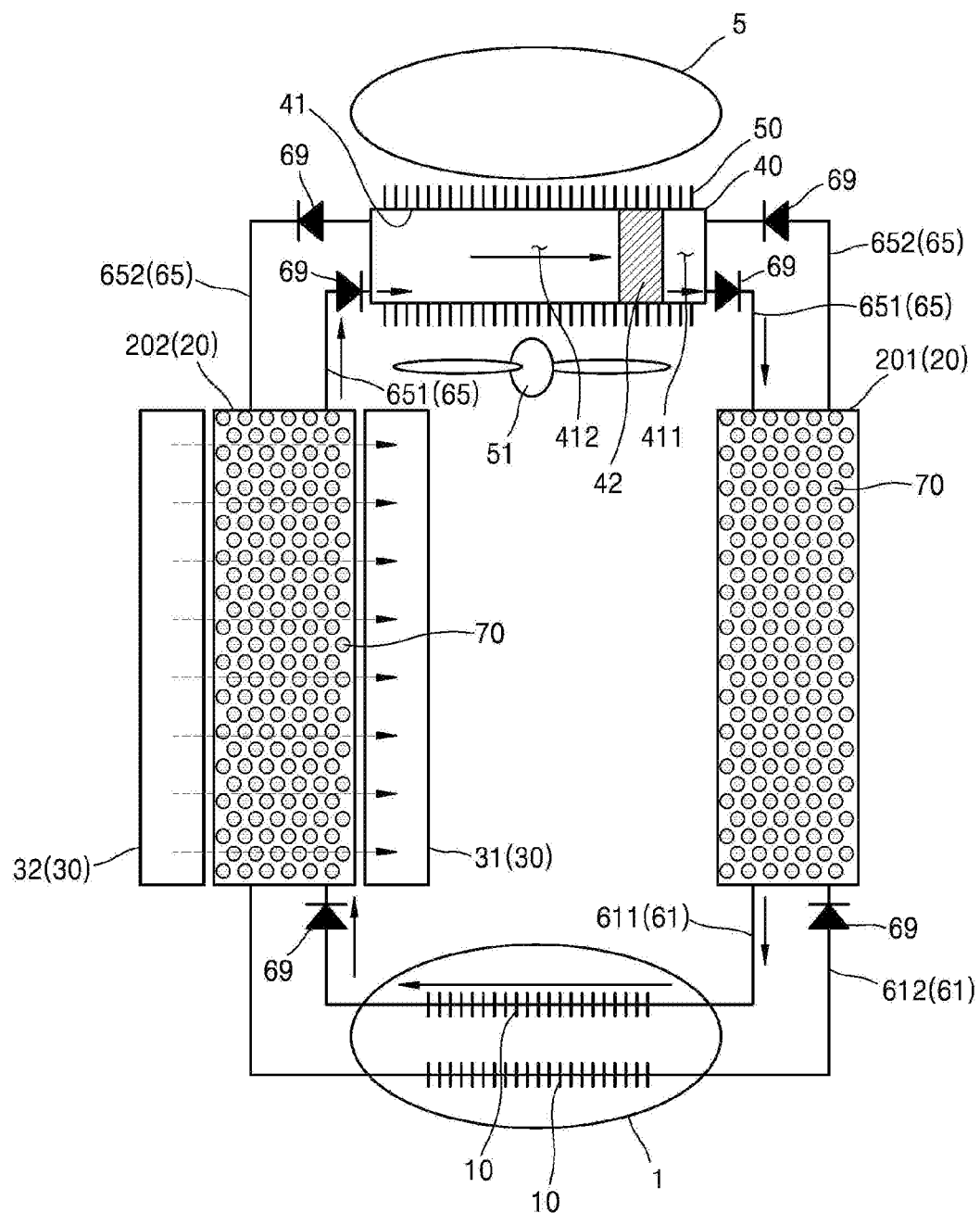

[Figure 2]
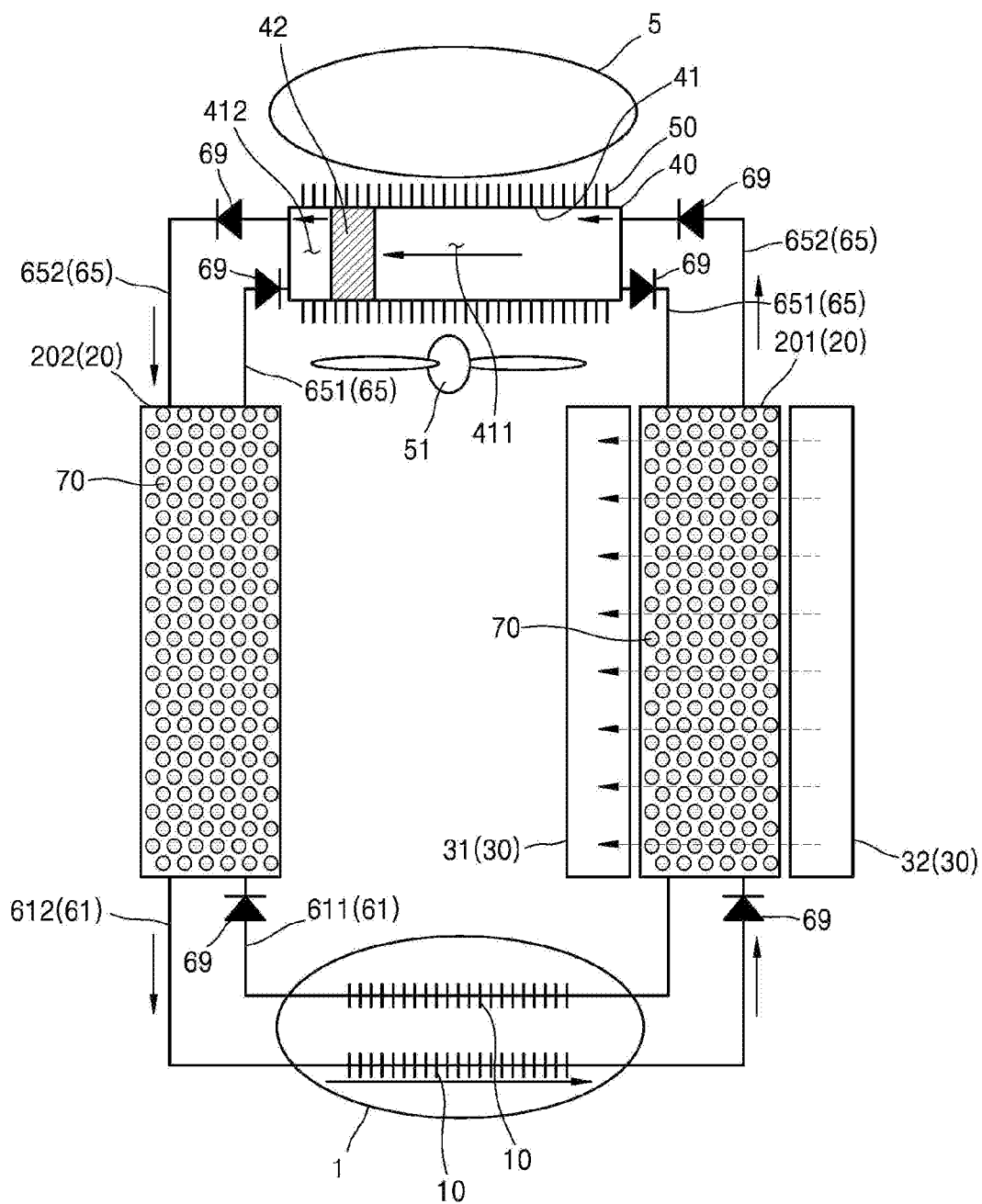

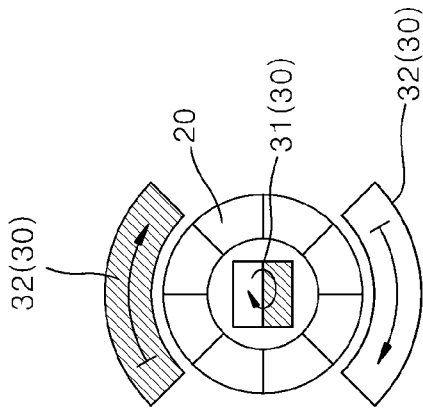
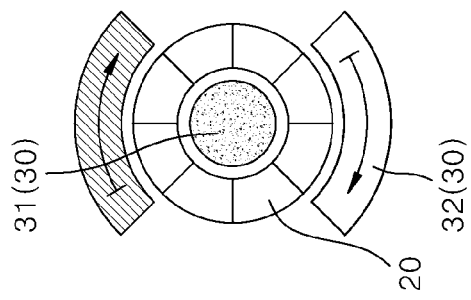
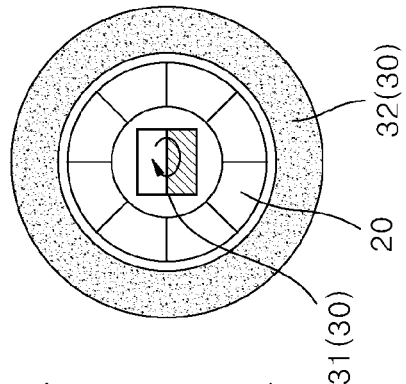
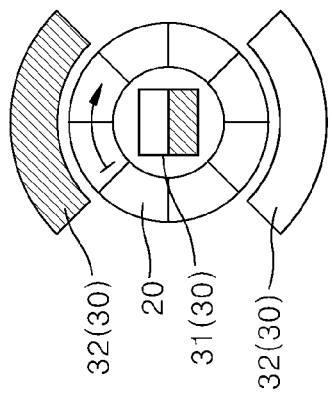

[Figure 4]
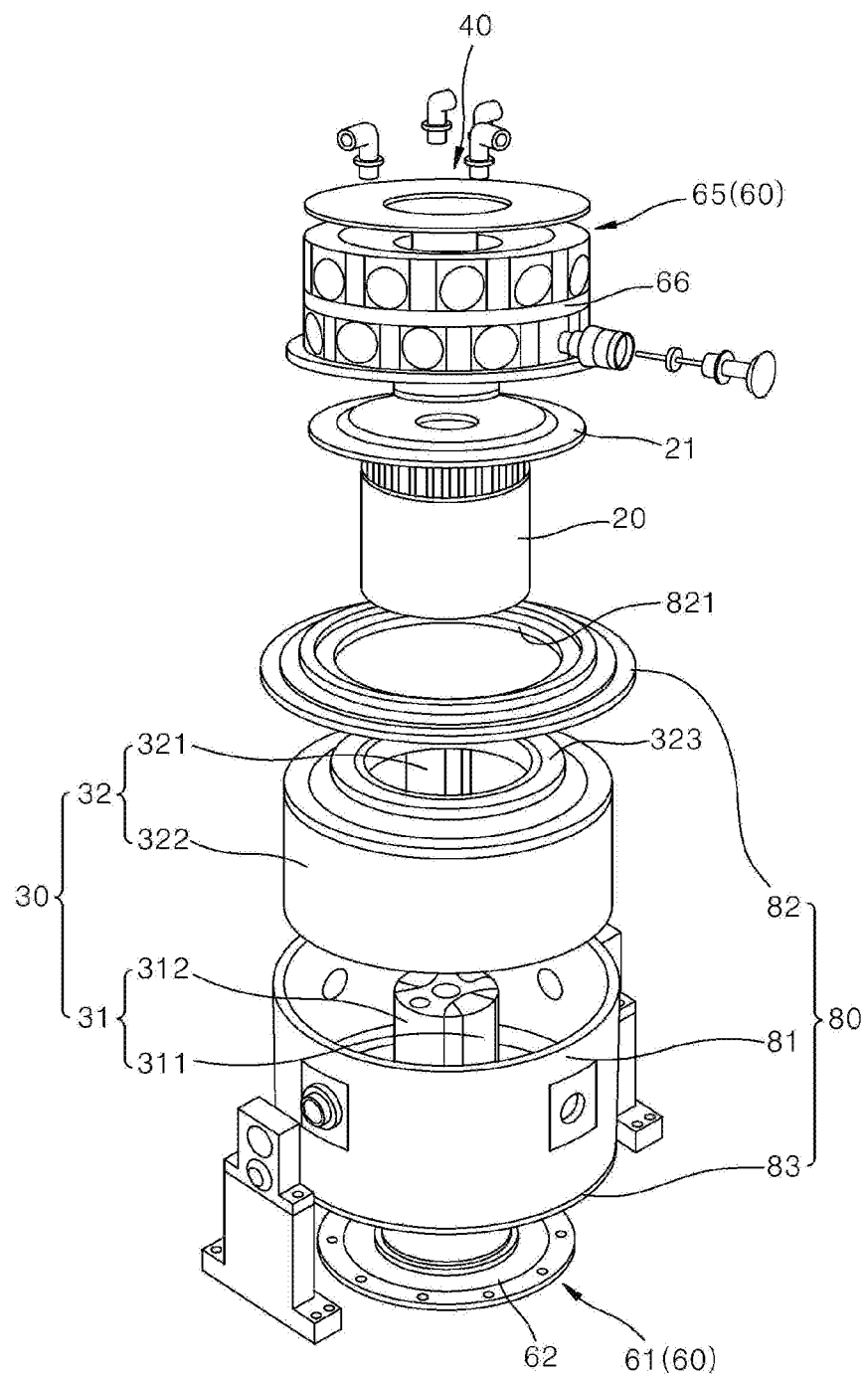

【Figure 5】
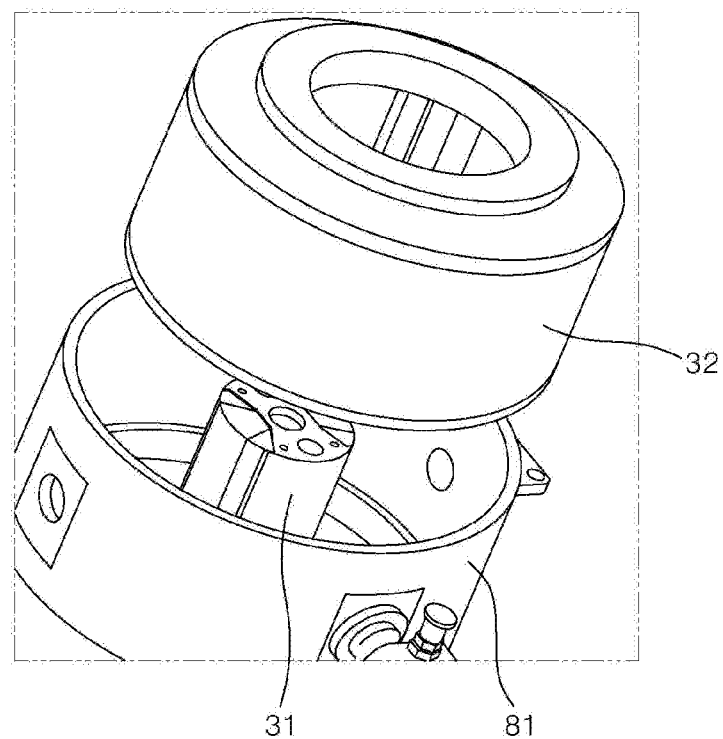

[Figure 6]
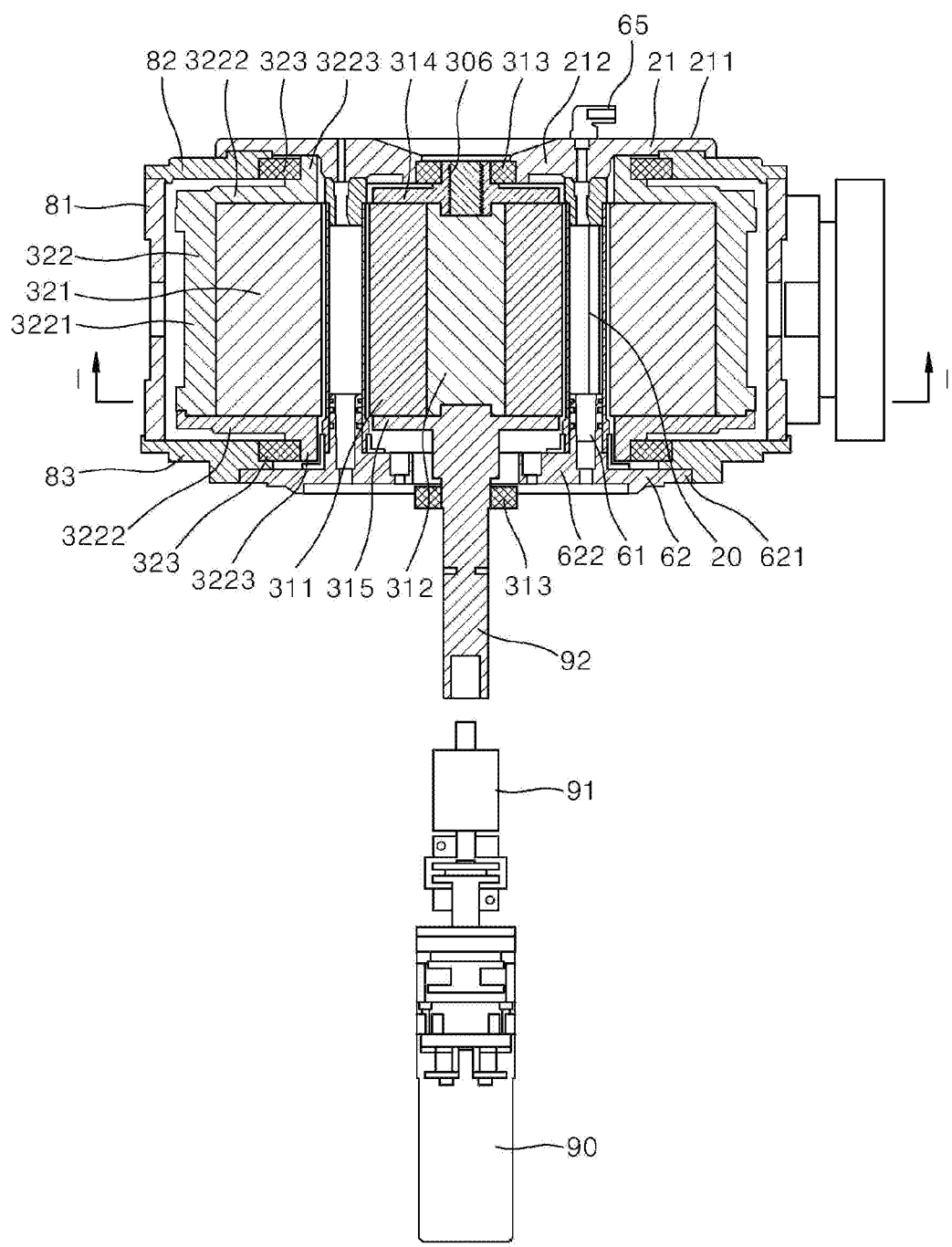

【Figure 7】
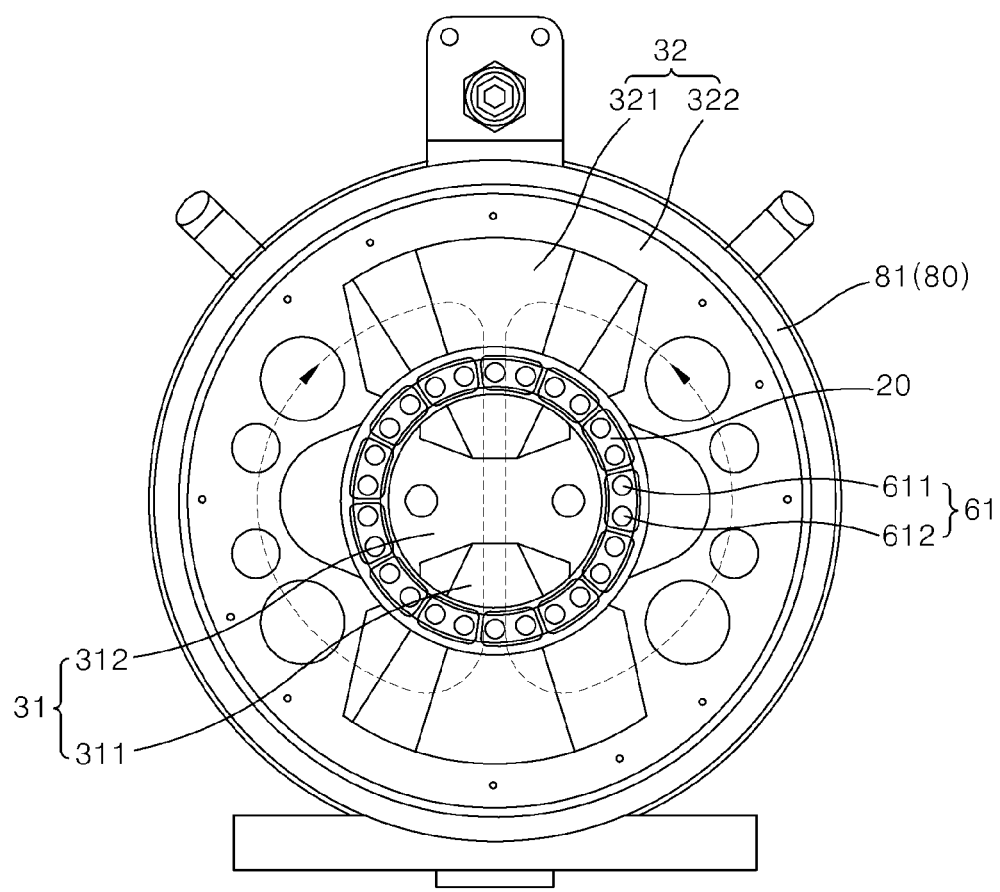

MAGNETIC COOLING SYSTEM

This application is the National Phase of PCT International Application No. PCT/KR2018/013578, filed on Nov. 8, 2018, which claims which claims the benefit of Korean Patent Application No. 10-2017-0160083 filed on Nov. 28, 2017, all the applications which are incorporated herein by reference in its entirety.

TECHNICAL FIELD

The present disclosure relates to a magnetic cooling system, and more particularly, to a driving method of two magnets for applying a magnetic field to a magnetocaloric material.

BACKGROUND

In general, a magnetic cooling system is a system using calories generated from a magnetocaloric material when a magnetic field is applied to the magnetocaloric material and calories absorbed by the magnetocaloric material when the magnetic field applied to the magnetocaloric material is removed.

That is, magnetic cooling uses a phenomenon (i.e., a magnetocaloric effect (MCE)) where a specific magnetocaloric material (or a magnetic material) generates heat in a magnetization process that applies a magnetic field to the magnetocaloric material and absorbs heat as the magnetocaloric material is demagnetized when the magnetic field is removed, and thus lowers an ambient temperature (e.g., a temperature of a heat transfer fluid). Magnetic cooling has drawn attention as an eco-friendly cooling technology as opposed to Freon or flon which is not being used.

The magnetocaloric material may be formed to exchange heat with a heat transfer fluid which may be a heat medium passing through the magnetocaloric material.

When a magnetic field is applied to the magnetocaloric material, the magnetocaloric material causes exothermic reaction and the heat transfer fluid passing through the magnetocaloric material may be heated.

In contrast, when the magnetic field applied to the magnetocaloric material is removed, the magnetocaloric material causes an endothermic reaction and the heat transfer fluid passing through the magnetocaloric material may be cooled.

In a magnetic heat exchanger (bed) in which the magnetocaloric material is stored, a direction in which the heat transfer fluid flows is changed and a pattern in which a magnetic field is applied or removed is repeated. The pattern in which the magnetic field is applied or removed can be variously implemented.

For example, a method of installing an electromagnet near the magnetic heat exchanger and applying power to or removing power from the electromagnet may be considered.

Alternatively, permanent magnets may be installed near the magnetic heat exchanger so that a magnetic field may be applied to or removed from a magnetocaloric material as the permanent magnets are moved close to or away from the magnetic heat exchanger.

However, in order to move the permanent magnets close to or away from the magnetic heat exchanger, a structure for operating two permanent magnets, which are spaced apart from each other, in connection with each other is desirable.

To address the above-described problems, the present disclosure is directed to providing a magnetic cooling system in which magnetic field applying parts, to which a permanent magnet is applied and which are spaced apart from each other, are used and moved in connection with each other through a simple structure.

SUMMARY

One aspect of the present disclosure includes a magnetic cooling system including a magnetocaloric material generating heat when a magnetic field is applied thereto and absorbing the heat when the magnetic field disappears; a magnetic heat exchanger in which the magnetocaloric material is embedded; a heat transfer fluid flowing inside the magnetic heat exchanger and exchanging heat with the magnetocaloric material; a magnetic field applying part including a first magnetic field applying part and a second magnetic field applying part installed with the magnetic heat exchanger disposed therebetween; a housing to accommodate the magnetic heat exchanger and the magnetic field applying part, fix the magnetic heat exchanger, and support the first magnetic field applying part and the second magnetic field applying part to be rotatable; and a driving part to move one of the first magnetic field applying part and the second magnetic field applying part, wherein moving of one of the first magnetic field applying part and the second magnetic field applying part by the driving part causes synchronous movement of the other due to attraction between the first magnetic field applying part and the second magnetic field applying part.

The magnetic heat exchanger may be installed in an erected form and has a cylindrical shape, the first magnetic field applying part may be located inside the cylindrical shape of the magnetic heat exchanger, and the second magnetic field applying part may be located outside the cylindrical shape of the magnetic heat exchanger.

The first magnetic field applying part may include a first magnet generating a magnetic field, and a core member to induce a magnetic circuit of the magnetic field. The second magnetic field applying part may include a second magnet disposed such that complementary polarities of the second magnet and the first magnet face each other to generate a magnetic field in cooperation with the first magnet, and a ring member to induce a magnetic circuit of the magnetic field.

The first magnet may be disposed on a radial location on an outer circumference of the core member, and the second magnet may be disposed on a radial location on an inner circumference of the ring member.

The housing may include a cylindrical outer circumferential wall surrounding an outer circumferential surface of the second magnetic field applying part, an annular first cover covering one side of the outer circumferential wall, and an annular second cover covering another side of the outer circumferential wall.

A first bearing may be installed around an inner upper portion of the second magnetic field applying part in a radial direction. The first bearing may be connected to inner circumferences of the first cover and the second cover in the radial direction.

A third cover extending outward in the radial direction may be provided at one end of the cylindrical shape of the magnetic heat exchanger. The third cover may be fixed on the first cover.

A fourth cover fastened with the other end of the magnetic heat exchanger and the second cover may be provided at the other end of the cylindrical shape of the magnetic heat exchanger.

The fourth cover may be provided with a heat medium flow path communicating with the magnetic heat exchanger.

The third cover including an outwardly extending part extending outward from the magnetic heat exchanger in the radial direction may be provided at one end of the cylindrical shape of the magnetic heat exchanger in an axial direction. The third cover may be fixed on the first cover.

The fourth cover including an outwardly extending member extending outward from the magnetic heat exchanger in the radial direction may be provided at the other end of the cylindrical shape of the magnetic heat exchanger in the axial direction. The fourth cover may be fastened to the other end of the magnetic heat exchanger, and the outwardly extending member may be fixed on the second cover.

The third cover may further include an inwardly extending part extending inward in the radial direction from the one end of the cylindrical shape of the magnetic heat exchanger in the axial direction.

The fourth cover may further include an inwardly extending member extending inward in the radial direction from the other end of the cylindrical shape of the magnetic heat exchanger in the axial direction, The inwardly extending part and the inwardly extending member may cover both sides of the first magnetic field applying part in the axial direction.

The first magnetic field applying part may include shafts extending outward from the center of rotation in the axial direction. A second bearing may be installed around the shafts. The second bearing may be connected to inner circumferences of the third cover and the fourth cover in the radial direction.

The third cover and the fourth cover may be provided with a heat medium flow path communicating with the magnetic heat exchanger. The third cover may be disposed above the fourth cover and include a high-temperature-side heat medium flow path, and the fourth cover may include a low-temperature-side heat medium flow path.

The first magnetic field applying part may be rotatably driven by the driving part.

The magnetic field applying part may make a rotational motion at a constant speed.

A rotational speed of the magnetic field applying part may be 300 rpm (5 Hz) or less.

The pump may cause the heat transfer fluid to flow. The pump may move the heat transfer fluid from a low-temperature section to a high-temperature section through the magnetic heat exchanger when the magnetic field applying part is moved close to the magnetic heat exchanger and move the heat transfer fluid from the high-temperature section to the low-temperature section through the magnetic heat exchanger when the magnetic field applying part is moved away from the magnetic heat exchanger.

The heat transfer fluid moving to the high-temperature section may dissipate heat from a high-temperature-side heat exchanger to the high-temperature section. The heat transfer fluid moving to the low-temperature section may absorb heat from the low-temperature section in a low-temperature-side heat exchanger.

Advantageous Effects

According to the present disclosure, two magnets are disposed with a magnetic heat exchanger disposed therebetween to form a very strong magnetic field in the magnetic heat exchanger, thereby increasing heat generation and absorption efficiency of a magnetocaloric material.

According to the present disclosure, a flow path of a heat transfer fluid is fixed and a magnetic field applying part is movable, thereby simplifying a structure of a magnetic cooling system.

In addition, according to the present disclosure, two magnetic field applying parts spaced apart from each other are moved in connection with each other by a magnetic force, thereby simplifying the structure of the magnetic cooling system.

In addition to the above-described effects, other effects of the present disclosure will be described in detail below with respect to specific matters for carrying out the present disclosure.

DESCRIPTION OF DRAWINGS

FIGS. 1 and 2 are schematic diagrams illustrating an operation of a magnetic cooling system.

FIGS. 3A-3D are schematic diagrams illustrating various methods of applying a magnetic field to and removing the magnetic field from a magnetic heat exchanger.

FIG. 4 is an exploded perspective view of a magnetic cooling system according to an embodiment of the present invention.

FIG. 5 is an enlarged view of an installation structure of a magnetic field applying part of the magnetic cooling system of FIG. 4.

FIG. 6 is a side cross-sectional view of a magnetic field applying part and a part of a magnetic heat exchanger of a magnetic cooling system according to the embodiment of the present invention.

FIG. 7 is a cross-sectional view taken along line I-I of FIG. 6.

DETAILED DESCRIPTION

Hereinafter, exemplary embodiments of the present invention will be described in detail with reference to the accompanying drawings.

The present invention is not limited to the embodiments set forth herein and may be embodied in many different forms. Rather, these embodiments are provided so that this disclosure will be thorough and complete and will fully convey the concept of the invention to those of ordinary skill in the art.

[Operation Principle of Magnetic Cooling System]

A structure and operation principle of a magnetic cooling system will be described with reference to FIGS. 1 and 2 below.

The magnetic cooling system includes a magnetic heat exchanger 20, a pump 40 and a heat exchanger 50 which are connected to one end of the magnetic heat exchanger 20, a heat exchanger 10 connected to the other end of the magnetic heat exchanger 20, and a heat medium flow path connecting the heat exchangers 10, 20, and 50 and the pump 40.

The magnetic cooling system is provided between a low-temperature section 1 and a high-temperature section 5 to maintain the low-temperature section 1 at a low temperature and transfer heat from the low-temperature section 1 towards the high-temperature section 5. The heat from the low-temperature section 1 is transferred from the low-temperature section 1 to the high-temperature section 5 through a heat transfer fluid which is a heat medium flowing along the heat medium flow path. For example, the heat transfer fluid may be water.

The magnetic cooling system includes the magnetic heat exchanger 20. The magnetic heat exchanger 20 may be in the form of a housing in which a magnetocaloric material 70 is embedded. The magnetocaloric material 70 may be accommodated to be fixedly stored in the magnetic heat exchanger 20. The heat transfer fluid flows in the magnetic heat exchanger 20 to be in contact with the magnetocaloric material 70 to exchange heat with magnetocaloric material 70.

The magnetocaloric material 70 is a material that generates heat when a magnetic field is applied thereto and absorbs heat when the magnetic field is removed therefrom. Therefore, when a magnetic field is applied to the magnetocaloric material 70, the heat transfer fluid flowing through a gap among the magnetocaloric material 70 absorbs heat generated from the magnetocaloric material 70, and thus, a temperature thereof increases. Conversely, when the magnetic field is removed from the magnetocaloric material 70, the heat transfer fluid flowing through the gap among the magnetocaloric material 70 transfers heat to the magnetocaloric material 70, and thus, the temperature thereof decreases.

In order to increase heat transfer efficiency between the magnetocaloric material 70 and the heat transfer fluid, it is desirable to increase a contact area between the magnetocaloric material 70 and the heat transfer fluid. When grain sizes of particles constituting the magnetocaloric material 70 are extremely small, flow loss of the heat transfer fluid becomes extremely large due to viscosity of the heat transfer fluid. In view of these points, the magnetocaloric material 70 may be provided in the form of particles having a diameter of about 0.1 mm.

The heat transfer fluid is moved by the pump 40. For example, the pump 40 may include a cylinder 41 in which a piston 42 makes a reciprocal movement as illustrated in the drawings. An inner space of the cylinder 41 may include a first reservoir 411 and a second reservoir 412 which are partitioned by the piston 42. For example, when the piston 42 moves to the right in FIG. 1, a space of the second reservoir 412 increases as a space of the first reservoir 411 decreases, and when the piston 42 moves to the left in FIG. 2, the space of the first reservoir 411 increases as the space of the second reservoir 412 decreases.

The magnetic heat exchanger 20 includes a first magnetic heat exchanger 201 and a second magnetic heat exchanger 202. According to one example, there is no particular difference between the heat exchangers 201 and 202, and the first and second heat exchangers 201 and 202 may be the same.

The first reservoir 411 of the pump 40 is connected to one end (upper side) of the first magnetic heat exchanger 201 through a high-temperature-side heat medium flow path 65. The heat transfer fluid flowing from the first reservoir 411 towards the first magnetic heat exchanger 201 flows to the first magnetic heat exchanger 201 through a first high-temperature-side heat medium flow path 651. The heat medium fluid flowing from the first magnetic heat exchanger 201 towards the first reservoir 411 flows to the first reservoir 411 through a second high-temperature-side heat medium flow path 652. In order to control a flow direction, a check valve 69 may be installed in each of the first high-temperature-side heat medium flow path 651 and the second high-temperature-side heat medium flow path 652.

Similarly, the second reservoir 412 of the pump 40 is connected to one end (upper side) of the second magnetic heat exchanger 202 through the high-temperature-side heat medium flow path 65. The heat transfer fluid flowing from the second reservoir 412 towards the second magnetic heat exchanger 202 flows to the second magnetic heat exchanger 202 through the second high-temperature-side heat medium flow path 652. The heat transfer fluid flowing from the second magnetic heat exchanger 202 towards the second reservoir 412 flows to the second reservoir 412 through the first high-temperature-side heat medium flow path 651. In order to control a flow direction, a check valve 69 may be installed in each of the first high-temperature heat medium flow path 651 and the second high-temperature-side heat medium flow path 652.

The heat exchanger 10 near the low-temperature section 1 is connected to the other end (lower side) of the magnetic heat exchanger 20 through a low-temperature-side heat medium flow path 61.

Specifically, the other end (lower side) of the first magnetic heat exchanger 201 and the other end (lower side) of the second magnetic heat exchanger 202 are connected to each other via a first low-temperature-side heat medium flow path 611 and a second low-temperature-side heat medium flow path 612 to which the check valve 69 is installed in opposite directions. The heat transfer fluid flowing from the first magnetic heat exchanger 201 to the second magnetic heat exchanger 202 flows through the first low-temperature-side heat medium flow path 611. The heat transfer fluid flowing from the second magnetic heat exchanger 202 to the first magnetic heat exchanger 201 flows through the second low-temperature-side heat medium flow path 612.

The heat exchanger 10 near the low-temperature section 1 is installed in the first low-temperature-side heat medium flow path 611 and the second low-temperature-side heat medium flow path 612, and thus, the heat transfer fluid flowing through the low-temperature-side heat medium flow path 61 exchanges heat with the low-temperature section 1 therethrough.

FIG. 1 illustrates a state in which a magnetic field applying part 30 is located in the second magnetic heat exchanger 202 and applies a magnetic field to the magnetocaloric material 70 embedded in the second magnetic heat exchanger 202.

In the state of FIG. 1, the piston 42 of the pump 40 moves to the right in the drawing to push the heat transfer fluid in the first reservoir 411 to the first magnetic heat exchanger 201 through the first high-temperature-side heat medium flow path 651. In this case, the heat transfer fluid is cooled ($-\Delta Q$) by an endothermic reaction ($+\Delta Q$) of the magnetocaloric material 70 in the first magnetic heat exchanger 201 from which the magnetic field is removed, and thereafter flows through the first low-temperature-side heat medium flow path 611. Accordingly, a temperature of the magnetocaloric material 70 in the first magnetic heat exchanger 201 increases.

The heat transfer fluid reaching the heat exchanger 10 near the low-temperature section 1 through the first low-temperature-side heat medium flow path 611 absorbs heat ($+\Delta Q$) from the low-temperature section 1, thereby cooling the low-temperature section 1 ($-\Delta Q$). In addition, the heat transfer fluid reaches the second magnetic heat exchanger 202 through the first low-temperature-side heat medium flow path 611 and passes through the second magnetic heat exchanger 202.

The magnetocaloric material 70 in the second magnetic heat exchanger 202 is under the magnetic field, and thus generates heat ($-\Delta Q$). Thus, the heat transfer fluid flowing through the second magnetic heat exchanger 202 absorbs the heat ($+\Delta Q$) from the magnetocaloric material 70 and a temperature thereof increases. Accordingly, the temperature of the magnetocaloric material 70 in the second magnetic heat exchanger 202 decreases.

The heat transfer fluid with the increased temperature flows to the second reservoir 412 of the pump 40 through the first high-temperature-side heat medium flow path 651, and the heat thereof is dissipated ($-\Delta Q$) by the heat exchanger 50 near the high-temperature section 5 and a fan 51, thereby cooling the heat transfer fluid.

The heat ($-\Delta Q$) of the low-temperature section 1 being transferred to the high-temperature section 5 ($+\Delta Q$) by the operation of the magnetic cooling system has been described above with reference to FIG. 1.

FIG. 2 illustrates a state in which a magnetic field applying part 30 is located in a first magnetic heat exchanger 201 and applies a magnetic field to a magnetocaloric material 70 embedded in the first magnetic heat exchanger 201.

In the state of FIG. 2, a piston 42 of a pump 40 moves to the left of the drawing to push a heat transfer fluid in a second reservoir 412 to a second magnetic heat exchanger 202 through a second high-temperature-side heat medium flow path 652. In this case, the heat transfer fluid is cooled ($-\Delta Q$) by an endothermic reaction ($+\Delta Q$) of the magnetocaloric material 70 in the second magnetic heat exchanger 202 from which the magnetic field is removed, and thereafter flows through the second low-temperature-side heat medium flow path 612. Accordingly, a temperature of the magnetocaloric material 70 in the second magnetic heat exchanger 202 increases.

The heat transfer fluid reaching the heat exchanger 10 near the low-temperature section 1 through the second low-temperature-side heat medium flow path 612 absorbs heat ($+\Delta Q$) from the low-temperature section 1, thereby cooling the low-temperature section 1 ($-\Delta Q$). In addition, the heat transfer fluid reaches the first magnetic heat exchanger 201 through the second low-temperature-side heat medium flow path 612 and passes through the first magnetic heat exchanger 201.

The magnetocaloric material 70 in the first magnetic heat exchanger 201 is under the magnetic field, and thus generates heat ($-\Delta Q$). Thus, the heat transfer fluid flowing through the first magnetic heat exchanger 201 absorbs the heat ($+\Delta Q$) from the magnetocaloric material 70 and a temperature thereof increases. Accordingly, the temperature of the magnetocaloric material 70 in the first magnetic heat exchanger 201 decreases.

The heat transfer fluid with the increased temperature flows to the first reservoir 411 of the pump 40 through the second high-temperature-side heat medium flow path 652, and the heat thereof is dissipated ($-\Delta Q$) by the heat exchanger 50 near the high-temperature section 5 and a fan 51, thereby cooling the heat transfer fluid.

The heat ($-\Delta Q$) of the low-temperature section 1 being transferred to the high-temperature section 5 ($+\Delta Q$) by the operation of the magnetic cooling system has been described above with reference to FIG. 2.

The operation of FIG. 1 and the operation of FIG. 2 may take place alternately.

Therefore, whenever the operations of FIGS. 1 and 2 occur, the heat ($-\Delta Q$) of the low-temperature section 1 is transferred to the high-temperature section 5 through the heat transfer medium ($+\Delta Q$), and thus the low-temperature section 1 is continuously cooled. In addition, a phase change of the heat transfer medium does not occur. Because a compressor and the like installed in conventional cooling systems are not installed in the magnetic cooling system, the magnetic cooling system may be more free from noise.

According to an embodiment of the present invention, the heat transfer fluid is moved through the first high-temperature-side heat medium flow path 651 and the first low-temperature-side heat medium flow path 611 when the heat transfer fluid flows in a first direction (a clockwise direction in FIG. 1), and is moved through the second high-temperature-side heat medium flow path 652 and the second low-temperature-side heat medium flow path 612 when the heat transfer fluid flows in a second direction (a counterclockwise direction in FIG. 2). That is, in each flow path, the heat transfer fluid flows only in one direction. Therefore, the heat transfer fluid does not flow in both a forward direction and a reverse direction in one flow path, thereby preventing heat transfer loss due to mixing of fluids.

In the operations of the magnetic cooling system of FIGS. 1 and 2 described above, a position of the magnetic field applying part 30 is related with a direction of flow of the heat transfer fluid by the pump 40 according to the movement of the magnetic field applying part 30.

As described above, a relative position change between the magnetic field applying part 30 and the magnetic heat exchanger 20 to operate the magnetic cooling system may be implemented in various aspects.

FIGS. 3A-3D illustrates various structures thereof. A magnetic cooling system in FIG. 3A shows a first example of a structure for applying a magnetic field to and removing the magnetic field from a plurality of magnetic heat exchangers 20 arranged side by side in a ring shape in a circumferential direction. A first magnet is provided as a first magnetic field applying part 31 inside the ring shape of the magnetic heat exchangers 20, and a second magnet is provided as a second magnetic field applying part 32 at locations corresponding to the two poles of the first magnet outside the ring shape of the magnetic heat exchangers 20.

A magnetic field is applied to the magnetic heat exchangers 20 between the positions of the two magnets 31 and 32 facing each other, and thus a magnetocaloric material 70 in the magnetic heat exchangers 20 generates heat. On the other hand, the magnetic field is removed from the other magnetic heat exchangers 20 which are not located at the positions of the two magnets 31 and 32 facing each other and, thus the magnetocaloric material 70 therein absorbs heat.

The first example of the magnetic heat exchangers in FIG. 3A shows a structure in which the magnetic heat exchangers 20 rotate. When the magnetic heat exchangers 20 rotate, each of the magnetic heat exchangers 20 is periodically and repeatedly located between the two magnets 31 and 32 or deviated from between the two magnets 31 and 32.

In an operation method of the first example of the magnetic heat exchangers in FIG. 3A, the magnetic heat exchangers 20 through which a heat transfer fluid should flow rotate, and thus sealing between piping parts and the like, which are relatively moved, may become very complicated.

A magnetic cooling system in FIG. 3B shows a second example of a structure for applying a magnetic field to or removing the magnetic field from magnetic heat exchangers 20. A first magnet is provided as a first magnetic field applying part 31 inside a ring shape of the magnetic heat exchangers 20, and a ring-shaped ferromagnetic body surrounding all the magnetic heat exchangers 20 is provided as a second magnetic field applying part 32 outside the ring shape of the magnetic heat exchangers 20.

In the second example of the magnetic heat exchangers in FIG. 3B, a magnetic field is applied to the magnetic heat exchangers 20 between positions of a pole portion of the first magnet 31 and the ring-shaped ferromagnetic body 32 facing each other. The magnetic field is removed from the other magnetic heat exchangers 20 which are not located between the positions of the pole portion of the first magnet 31 and the ring-shaped ferromagnetic body 32 facing each other In the second example of the magnetic heat exchangers in FIG. 3B, the first magnet 31 at an inner side is rotated such that each of the magnetic heat exchangers 20 repeatedly faces or does not face a pole of the first magnet 31.

In an operation method of the second example of the magnetic heat exchangers in FIG. 3B, only the first magnet 31 inside the magnetic heat exchanger in FIG. 3B is rotated and the ring-shaped ferromagnetic body 32 need not be rotated, thereby simplifying the structure. However, unlike the first example in which the magnetic heat exchanger 20 is disposed between gaps at which different poles face each other, the strength of the magnetic field is inevitably weak, thus reducing heat generation and absorption efficiency of the magnetocaloric material 70.

A magnetic cooling system in FIG. 3C shows a third example of a structure for applying a magnetic field to and removing the magnetic field from magnetic heat exchangers 20. A ferromagnetic core is provided as a first magnetic field applying part 31 inside a ring shape of the magnetic heat exchangers 20, and an arch-shaped second magnet is provided as a second magnetic field applying part 32 in a certain section outside the ring shape of the magnetic heat exchangers 20.

In the third example of the magnetic heat exchangers in FIG. 3C, a magnetic field is applied to the magnetic heat exchangers 20 between positions of the second magnet 32 and the ferromagnetic core 31 facing each other. The magnetic field is removed from the other magnetic heat exchangers 20 which are not located between the positions of the second magnet 32 and the ferromagnetic core 31.

In the third example of the magnetic heat exchangers in FIG. 3C, an outer second magnet 32 is rotated such that each of the magnetic heat exchangers 20 repeatedly faces or does not face the second magnet 32.

In an operation method of the third example of the magnetic heat exchangers in FIG. 3C, only the outer second magnet 32 is rotated, and thus the structure may be simplified although it is slightly more complicated than that of the second example. However, unlike the first example in which the magnetic heat exchanger 20 is disposed between gaps at which different poles face each other, the strength of the magnetic field is inevitably weak, thus reducing heat generation and absorption efficiency of the magnetocaloric material 70.

A structure of magnetic heat exchangers in FIG. 3D of a fourth example is the same as that of the first example of the magnetic heat exchangers in FIG. 3A. However, the fourth example is different from the first example in that the magnetic heat exchangers 20 are fixed and a first magnet 31 and a second magnet 32 are rotated together.

Because the magnetic heat exchangers 20 block a gap between the first magnet 31 and the second magnet 32, a power transmission structure should be provided to interlock the two magnets 31 and 32 while bypassing the heat exchangers 20 so as to rotate the first magnet 31 and the second magnet 32 in synchronization with each other.

However, the inventor has devised and provided a structure for rotating the first magnet 31 and the second magnet 32 in synchronization with each other only by attraction of the first magnet 31 and the second magnet 32 of which opposite polarities face each other, based on the fact that a period of applying a magnetic field to or removing the magnetic field from a magnetic heat exchanger in a magnetic cooling device is relatively long, and thus the first magnet 31 and the second magnet 32 rotate at a constant low speed.

That is, the principle that when the first magnet 31 is rotated, the second magnet 32 is rotated with the first magnet 31 by attraction, or when the second magnet 32 is rotated, the first magnet 31 is rotated with the second magnet 32 by attraction is used. According to this principle, the two magnets 31 and 32 can be rotated through a very simple structure, and at the same time, the strength of a magnetic field applied to or removed from the magnetic heat exchanger 20 can be greatly increased.

For reference, the larger the difference in variations in magnetic flux density given to a magnetocaloric material, the higher a heat generation/absorption performance coefficient, and thus, cooling performance is improved as the strength of a magnetic field increases. In this respect, cooling performance according to the first and fourth examples of FIGS. 3A and 3D are far higher than that of the second and third examples of FIGS. 3B and 3C.

Furthermore, when the strength of the magnetic field is strong, an attraction between the first magnet 31 and the second magnet 32 increases, thereby facilitating synchronous movement of the two magnetic field applying parts 31 and 32.

[Structure of Magnetic Cooling System]

A structure of a magnetic cooling system according to an embodiment of the present invention will be described in detail with reference to FIGS. 4 to 7 below.

The magnetic cooling system includes a housing 80 in which a magnetic heat exchanger 20 and a magnetic field applying part 30 are accommodated. The housing 80 includes an outer circumferential wall 81 which is a side wall of a cylindrical shape, a first cover 82 having a flat ring shape covering an upper portion (one end) of the outer circumferential wall 81, and a second cover 83 having a flat ring shape covering a lower portion (the other end) of the outer circumferential wall 81. The housing 80 is fixed at a fixed side. The housing 80 has an inner cylindrical hollow portion.

In an inner space defined by the housing 80, a second magnetic field applying part 32 is accommodated at a location farthest from the center of the cylindrical shape. The second magnetic field applying part 32 is installed in the housing 80 to freely rotate relative to the housing 80.

Specifically, the second magnetic field applying part 32 is formed in a ring shape. The second magnetic field applying part 32 is provided with a second magnet 321 at a certain portion of an inner circumferential surface of a ring member 322 having a roughly ring shape, and thus has a ring shape like a toilet paper as a whole. The second magnet 321 is installed at a radial position from the center of the second magnetic field applying part 32.

In the embodiment of the present invention, a structure in which two second magnets 321 are installed at 180-degree intervals is illustrated. However, various modifications may be made when necessary, and for example, three magnets may be installed at 120-degree intervals, or four magnets may be installed at 90-degree intervals.

The ring member 322 includes cylinder-shaped vertically extending members 3221 surrounding the outer circumferential surface of the second magnet 321, radially inwardly extending members 3222 extending inward in the form of a flange from upper and lower ends of the extending members 3221 in a radial direction, and ring-shaped bearing seating flanges 3223 extending outward in an axial direction at radially inner ends of the pair of radially inwardly extending members 3222.

The radially inwardly extending members 3222 cover upper and lower sides of the second magnet 321. One of the pair of radially inwardly extending members 3222 may be integrally formed with the vertically extending members 3221, and the other may be assembled after being separately manufactured. The separately manufactured radially inwardly extending member 3222 may be assembled after the second magnet 321 is installed inside the vertically extending members 3221.

A first bearing 323 is provided at each of upper and lower portions of the inner circumferential surface of the second magnetic field applying part 32. The first bearing 323 may be a rolling bearing in which a rolling body such as a ball is disposed in an inner ring and an outer ring thereof and interposed between the inner ring and the outer ring. Each of the bearing seating flanges 3223 on the upper and lower sides of the second magnetic field applying part 32 is engaged with an inner circumferential surface of the inner ring of one of the first bearings 323 and a side of the first bearing 323 in the axial direction.

The first bearing 323 is supported by being installed on an inner circumferential surface of a hole 821 provided in the centers of the first cover 82 and the second cover 83 and/or the vicinity of the hole 821. That is, the outer rings of a pair of first bearings 323 are fixed on the first cover 82 and the second cover 83 of the housing 80, respectively. Specifically, the outer circumferential surface of the outer ring of the first bearing 323 and the other surface thereof in the axial direction are engaged with inner edges of the first cover 82 and the second cover 83, respectively.

Therefore, the second magnetic field applying part 32 is rotatably supported on the housing 80 through the first bearings 323 installed at the upper and lower sides thereof. The rolling bearing supports the second magnetic field applying part 32 to be rotatable in not only the radial direction but also the axial direction. That is, the first bearing 323 controls the position of the second magnetic field applying part 32 in the axial direction.

The second magnetic field applying part 32 is rotatably installed and accommodated in the housing 80. Specifically, the outer circumferential wall 81 of the housing 80 surrounds the vertically extending members 3221 of the second magnetic field applying part 32, and the first cover 82 and the second cover 83 of the housing 80 cover the radially inwardly extending members 3222. Therefore, the housing 80 and the second magnetic field applying part 32 may be provided in a module. The second magnet 321 is disposed on an inner circumferential surface of the module of the housing 80 and the second magnetic field applying part 32. When the housing 80 and the second magnetic field applying part 32 are provided in a module as described above, the inside of the magnetic cooling system, e.g., the first bearing 323, a second bearing 313, and the magnetic heat exchanges 20, may be maintained simply by separating only one of a third cover 21 and a fourth cover 62 described below. In addition, according to the structure of the module of the second magnetic field applying part unit 32 and the housing 80, the first bearing 323 may be greatly reduced in diameter.

A magnetic heat exchanger 20 is installed in a hollow space defined by the inner circumferential surface of the second magnetic field applying part 32. Similarly, the magnetic heat exchanger 20 has a ring shape like a toilet paper as a whole. In addition, an outer circumferential surface of the magnetic heat exchanger 20 is slightly smaller in diameter than the inner circumferential surface of the second magnetic field applying part 32, and thus the magnetic heat exchanger 20 is slightly spaced apart from the second magnetic field applying part 32. The second magnetic field applying part 32 and the magnetic heat exchanger 20 are concentrically aligned.

The magnetic heat exchanger 20 is an assembly of a plurality of vertically extending magnetic heat exchangers arranged side by side in the circumferential direction. In the embodiment of the present invention, an assembly structure of thirteen magnetic heat exchangers 20 arranged side by side in the circumferential direction as shown in FIG. 7 is illustrated. FIG. 7 illustrates a structure in which a pair of low-temperature-side heat medium flow paths 611 and 612 are connected to a lower end of one magnetic heat exchangers 20 as described above with reference to FIGS. 1 and 2.

The number of magnetic heat exchangers 20, the number of heat medium flow paths, or the like may be variously changed according to the specifications of the magnetic cooling system or the purpose of flow of a heat medium.

An upper end of the magnetic heat exchanger 20 is provided with the third cover 21 having an annular flat plate shape and extending outward from the upper end of the magnetic heat exchanger 20 and extending inward. An outwardly extending part 211 of the third cover 21, which extends outward from the magnetic heat exchanger 20, is fixed and engaged with an upper surface of the first cover 82 near the hole 821 of the first cover 82 of the housing 80. Accordingly, the magnetic heat exchanger 20 is fixedly installed on the housing 80. The outwardly extending part 211 is disposed to be spaced upward from the bearing seating flange 3223 and the first bearing 323. The third cover 21 may be assembled with the magnetic heat exchanger 20 for ease of assembly and the like. In this case, a state in which the magnetic heat exchanger 20 is accommodated inside the housing 80 may be maintained during an assembly process simply by mounting the third cover 21 on the first cover 82. An inwardly extending part 212 of the third cover 21, which extends inward from the magnetic heat exchanger 20, supports a second bearing 313 of a first magnetic field applying part 31 described below.

Referring to FIG. 6, the fourth cover 62 is fixed on a lower end of the magnetic heat exchanger 20 and the second cover 83 of the housing 80. The fourth cover 62 has an annular flat plate shape and extends outward from the lower end of the magnetic heat exchanger 20 in the radial direction and also extends inward. An outwardly extending member 621 of the fourth cover 62, which extends outward from the magnetic heat exchanger 20, is fixed and engaged with the lower surface of the second cover 83 near the inner circumferential surface of the second cover 83 of the housing 80. Accordingly, the magnetic heat exchanger 20 is fixedly installed on the housing 80. The outwardly extending member 621 is spaced downward from the bearing seating flange 3223 and the first bearing 323. An inwardly extending member 622 of the fourth cover 62, which extends inward from the magnetic heat exchanger 20, supports the second bearing 313 of the first magnetic field applying part 31 described below.

The fourth cover 62 firmly fixes the lower end of the magnetic heat exchanger 20 onto the housing 80. In addition, a low-temperature-side heat medium flow path 61 connected to the lower end of the magnetic heat exchanger 20 is formed in the fourth cover 62.

For reference, the fourth cover 62 may be fixed on the magnetic heat exchanger 20 and the housing 80 in a state in which the third cover 21 integrally assembled with the magnetic heat exchanger 20 is fixed on the housing 80 and the first magnetic field applying part 31, described below, is accommodated inside the magnetic heat exchanger 20.

A hole through which a shaft 92, described below, will pass is formed in a central portion of the fourth cover 62. Similarly, when the shaft 92 is connected to an upper side of the magnetic cooling system, a hole through which the shaft 92 will pass may be formed in the center of the third cover 21. This may also apply to a case in which the third cover 21 is located at a lower side of the magnetic cooling system and the fourth cover 62 having a flow path member is installed at an upper side of the magnetic cooling system.

The first magnetic field applying part 31 is installed in a ring-shaped inner space of the magnetic heat exchanger 20. The first magnetic field applying part 31 is formed in a cylindrical shape. The first magnetic field applying part 31 includes a first magnet 311 provided at a location corresponding to the second magnet 321. The first magnet 311 is installed on an outer circumference of a cylindrical core member 312 and has a cylindrical shape as a whole. The outer circumferential surface of the first magnetic field applying part 31 is slightly smaller in diameter than the inner circumferential surface of the magnetic heat exchanger 20, and thus the first magnetic field applying part 31 is spaced apart from the magnetic heat exchanger 20. The first magnetic field applying part 31, the magnetic heat exchanger 20 and the second magnetic field applying part 32 are concentrically aligned with one another.

In the embodiment of the present invention, a structure in which two first magnets 311 are installed at 180-degree intervals is illustrated. However, various modifications may be made when necessary, and for example, three magnets may be installed at 120-degree intervals or four magnets may be installed at 90-degree intervals. The number and arrangement of the first magnets 311 may be modified to correspond to those of the second magnets 321.

An upper member 314 and a lower member 315 are coupled to the upper and lower ends of the first magnetic field applying part 31, respectively. The upper member 314 includes a shaft extending portion 306 extending upward to be parallel to a rotational central axis, and the lower member 315 includes the shaft 92 extending downward from the center of rotation thereof. The second bearing 313 is installed on the upper member 314 and the lower member 315. The second bearing 313 may be a rolling bearing in which a rolling body such as a ball is disposed in an inner ring and an outer ring thereof and interposed between the inner ring and the outer ring.

The upper member 314 and the shaft extending portion 306 of the first magnetic field applying part 31 mesh with an inner circumferential surface of the inner ring of the second bearing 313 and a side of the second bearing 313 in the axial direction. An inner edge of the inwardly extending part 212 of the third cover 21 meshes with an outer circumferential surface of the outer ring of the second bearing 313 and a side of the second bearing 313 in the axial direction.

The shaft 92 of the lower member 315 meshes with the inner circumferential surface of the inner ring of the second bearing 313 and the side of the second bearing 313 in the axial direction. An outer circumferential surface of the outer ring of the second bearing 313 and a side thereof in the axial direction corresponding thereto mesh with the inwardly extending member 622 of the fourth cover 62.

The second bearing 313 at the upper end of the first magnetic field applying part 31 is installed near the inner circumferential surface of the upper end of the third cover 21 of the magnetic heat exchanger 20 fixed on the first cover 82 of the housing 80, thereby fixing the second bearing 313 on the housing 80. The second bearing 313 at the lower end of the first magnetic field applying part 31 is installed near the inner circumferential surface of the fourth cover 62 fixed to the second cover 83 of the housing 80, thereby fixing the second bearing 313 on the housing 80. The second bearing 313 at the lower end of the first magnetic field applying part 31 may be located at the lower end of the first magnetic field applying part 31 or the shaft 92 connected to the lower end of the first magnetic field applying part 31. Accordingly, the first magnetic field applying part 31 is also rotatably installed in the housing 80.

According to the above structure, the diameters of the bearings 313 and 323 supporting the rotation of the two magnetic field applying parts 31 and 32 that rotate relative to the housing 80 may be minimized, thereby increasing the reliability of the bearings 313 and 323 and minimizing costs of the bearings 313 and 323. The bearings 313 and 323 and the magnetic heat exchanger 20 described above are accessible from the outside only by separating the third cover 21 and the fourth cover 62 without separating the first cover 81 and the second cover 83, and thus are convenient to maintain.

A heat medium flow path 60 may be formed in the third cover 21 and the fourth cover 62. Specifically, the high-temperature-side heat medium flow path 65 may be formed in the third cover 21, and the low-temperature-side heat medium flow path 61 may be formed in the fourth cover 62. That is, the third cover 21 and the fourth cover 62 may support the magnetic heat exchanger 20 and the first magnetic field applying part 31 by coupling them to the housing 80, form the heat medium flow path 60, and cover and protect the bearings 313 and 323.

According to the embodiment of the present invention, the shaft 92 extends downward to the lower end of a central axis of the first magnetic field applying part 31 and is connected to a driving part 90, e.g., a motor 90, through a reducer 91.

When the motor 90 rotates, the speed thereof is decreased by the reducer 91 and is transmitted to the shaft 92, and the first magnetic field applying part 31 rotates relative to the housing 80. In this case, an attractive force is applied to the second magnet 321 facing the first magnet 311 of the first magnetic field applying part 31, thereby rotating the second magnetic field applying part 32 having the second magnet 321 together with the first magnetic field applying part 31.

A moment of inertia of the second magnetic field applying part 32 is greater than that of the first magnetic field applying part 31. Therefore, when an attraction between the two magnetic field applying parts 31 and 32 is insufficient, an angular offset inevitably occurs between the first magnetic field applying part 31 and the second magnetic field applying part 32.

However, the first magnetic field applying part 31 and the second magnetic field applying part 32 make a movement at a constant and slow velocity and the two magnets 311 and 312 are located very close to each other. Thus, an angular offset between the first magnetic field applying part 31 and the second magnetic field applying part 32 does not exceed three to four degrees even when these magnetic field applying parts are excessively driven, and thus such offset has little effect on performance.

Accordingly, even when the first magnetic field applying part 31 is rotationally driven and an additional physical power transmission structure is not provided in addition to the attraction between the two magnets 311 and 312, the synchronous rotation of the two magnetic field applying parts 31 and 32 is not disrupted.

The rotational speed of the two magnetic field applying parts 31 and 32 may be set not to exceed 300 rpm, i.e., 5 Hz, and may be preferably operated at about 2 Hz.

Although rotational driving of the first magnetic field applying part 31 is preferable in that the driving system can be more simplified, a method of driving the second magnetic field applying part 32 for synchronous movement of the first magnetic field applying part 31 due to attraction may be applied.

Referring to FIG. 7, the first magnet 311 of the first magnetic field applying part 31 and the second magnet 321 of the second magnetic field applying part 32 are disposed such that complementary poles thereof face each other. The core member 312 and the ring member 322 are formed of a ferromagnetic material. Thus, a magnetic circuit is configured by the first magnetic field applying part 31 and the second magnetic field applying part 32 in a direction of a broken line arrow shown in FIG. 7.

When the first magnetic field applying part 31 and the second magnetic field applying part 32 are rotated by the driving part 90 in a state in which the magnetic circuit is configured as described above, a magnetic field is sequentially and repeatedly applied to and removed from a plurality of magnetic heat exchangers 20 fixed on the housing 80.

Referring to FIG. 4, an assembly with the high-temperature-side heat medium flow path 65 is installed on the magnetic heat exchanger 20 fixed on the housing 80. A pump 40 as described above with reference to FIGS. 1 and 2 is embedded inside the assembly.

A more natural flow may be induced when a low-temperature heat medium flows downward and a high-temperature heat medium flows upward. In addition, when a gas is generated from a heat transfer fluid, it is desirable to make the gas rise upward without being trapped. In particular, a gas is much lower in specific volume than a liquid, and thus heat exchange efficiency may decrease rapidly when a gas is generated from the heat transfer fluid.

Thus, the magnetic cooling system according to the embodiment of the present invention is installed in an erected form as shown in FIG. 4 or 6. In addition, the low-temperature-side heat medium flow path 61 is disposed under the magnetic heat exchanger 20, and the high-temperature-side heat medium flow path 65 and the pump 40 are disposed on the magnetic heat exchanger 20 so that an upper side of the magnetic heat exchanger 20 may be a high-temperature section 5 and a lower side thereof may be a low-temperature section 1. In this case, a gas generated from the heat transfer fluid naturally rises to the top, thereby preventing the gas from being trapped or staying in the magnetic heat exchanger 20. Therefore, the inside of the magnetic heat exchanger 20 may be fully filled with the heat transfer fluid without a gas therein, and thus heat exchange efficiency does not decrease. In contrast, in a structure in which a magnetic heat exchanger is installed in a lying position, a gas generated from the heat transfer fluid continuously stays in the magnetic heat exchanger, thereby inevitably reducing heat exchange efficiency.

In addition, the magnetic field applying part 30 is rotatably installed and the magnetic heat exchanger 20 is fixedly installed in the housing 80 between the two heat medium flow paths. In addition, the low-temperature-side heat medium flow path 61 passes through a low-temperature-side heat exchanger located in a low-temperature part (not shown) and the high-temperature-side heat medium flow path 65 passes through a high-temperature-side heat exchanger located in a high-temperature part (not shown).

An operation of the magnetic cooling system according to an embodiment of the present invention will be described below.

The driving part 90 rotates the first magnetic field applying part 31 at 2 Hz. In this case, the second magnetic field applying part 32 rotates in synchronization with the first magnetic field applying part 31 by attraction to the first magnetic field applying part 31. The pump 40 lifts the heat transfer fluid from the magnetic heat exchanger 20, which is magnetized as the magnetic heat exchanger 20 is adjacent to the magnetic field applying part 30 moved by the driving part 90, to the high-temperature-side heat medium flow path 65 and pushes the heat transfer fluid towards another magnetic heat exchanger 20, which is demagnetized as the magnetic heat exchanger 20 is moved away from the magnetic field applying part 30.

Because the two magnetic heat exchangers 20 communicate with each other through the low-temperature-side heat medium flow path 61, the heat transfer fluid flowing in the demagnetized magnetic heat exchanger 20 is cooled by the magnetocaloric material 70, flows downward to the low-temperature-side heat medium flow path 61, transfers cold air to a low-temperature section 1 from a low-temperature-side heat exchanger, and moves upward to the high-temperature-side heat medium flow path 65 while flowing in the magnetized magnetic heat exchanger 20 and being heated by the magnetocaloric material 70, thereby dissipating heat to the high-temperature-side heat medium flow path 65.

When the driving part 90 continue to rotate the first magnetic field applying part 31 to move the magnetic field applying part 30 to the magnetic heat exchanger 20 neighboring the magnetic field applying part 30, the pump 40 causes the heat transfer fluid to flow in an opposite direction. The operation as described above is repeatedly performed to continuously cool the low-temperature section 1.

Although the present invention has been described above with reference to the drawings set forth herein, the present invention is not limited by the embodiments and drawings set forth herein and it will be apparent that various modifications can be made by those of ordinary skill in the art without departing from the scope of the present invention. In addition, although operations and effects according to the configuration of the present disclosure are not explicitly described by explaining embodiments of the present invention, it is natural that effects predictable from the configuration should also be recognized and encompassed by the claims.

The invention claimed is:

1. A magnetic cooling system comprising:
    a magnetocaloric material that generates heat when a magnetic field is applied thereto and absorbs the heat when the magnetic field disappears;
    a magnetic heat exchanger in which the magnetocaloric material is embedded;
    a heat transfer fluid that flows inside the magnetic heat exchanger and exchanges heat with the magnetocaloric material;
    a first magnet and a second magnet installed with the magnetic heat exchanger therebetween;
    a motor to move one of the first magnet and the second magnet; and
    a housing to accommodate the magnetic heat exchanger, the first magnet, and the second magnet, the housing to fix the magnetic heat exchanger, and rotatably support the first magnet and the second magnet,
    wherein moving of one of the first magnet and the second magnet by the motor causes synchronous movement of the other due to magnetic attraction between the first magnet and the second magnet, and wherein the magnetic heat exchanger is installed in an erected form, and wherein the housing comprises:

a cylindrical outer circumferential wall surrounding an outer circumferential surface of the second magnet;

an annular first cover covering one side of the outer circumferential wall; and an annular second cover covering an other side of the outer circumferential wall, and wherein the magnetic cooling system further comprises a first bearing installed around an inner upper portion of the second magnet in a radial direction, and wherein the first bearing is connected to inner circumferences of the first cover and the second cover in the radial direction.

2. The magnetic cooling system of claim 1, wherein the magnetic heat exchanger has a cylindrical shape, the first magnet is located inside the cylindrical shape of the magnetic heat exchanger, and the second magnet is located outside the cylindrical shape of the magnetic heat exchanger.

3. The magnetic cooling system of claim 2, further comprising:

the first magnet to generate a first magnetic field; and a core member to induce a magnetic circuit of the first magnetic field, and the second magnet disposed such that complementary polarities of the second magnet and the first magnet face each other, and to generate a second magnetic field for cooperation with the first magnet; and a ring member to induce a magnetic circuit of the second magnetic field.

4. The magnetic cooling system of claim 3, wherein the first magnet is disposed on a radial location on an outer circumference of the core member, and the second magnet is disposed on a radial location on an inner circumference of the ring member.

5. The magnetic cooling system of claim 1, further comprising a third cover including an outwardly extending part extending outward from the magnetic heat exchanger in a radial direction, the third cover being provided at one end of the cylindrical shape of the magnetic heat exchanger in an axial direction.

6. The magnetic cooling system of claim 5, wherein the third cover is fixed on the first cover.

7. The magnetic cooling system of claim 5, further comprising a fourth cover including an outwardly extending member extending outward from the magnetic heat exchanger in the radial direction, the fourth cover being provided at an other end of the cylindrical shape of the magnetic heat exchanger in the axial direction.

8. The magnetic cooling system of claim 7, wherein the fourth cover is fixed to the other end of the magnetic heat exchanger, and the outwardly extending member is fixed on the second cover.

9. The magnetic cooling system of claim 7, wherein the third cover further comprises an inwardly extending part extending inward in the radial direction from the one end of the cylindrical shape of the magnetic heat exchanger in the axial direction, and the fourth cover further comprises an inwardly extending member extending inward in the radial direction from the other end of the cylindrical shape of the magnetic heat exchanger in the axial direction, wherein the inwardly extending part and the inwardly extending member cover both sides of the first magnet in the axial direction.

10. The magnetic cooling system of claim 9, the first magnet comprises shafts extending outward from a center of rotation in the axial direction, and a second bearing is installed around the shafts, wherein the second bearing is connected to inner circumferences of the third cover and the fourth cover in the radial direction.

11. The magnetic cooling system of claim 7, wherein the third cover and the fourth cover are provided with a heat medium flow path communicating with the magnetic heat exchanger.

12. The magnetic cooling system of claim 11, wherein the third cover is disposed above the fourth cover and comprises a high-temperature-side heat medium flow path, and the fourth cover comprises a low-temperature-side heat medium flow path.

13. The magnetic cooling system of claim 1, wherein the first magnet is rotatably driven by the motor.

14. The magnetic cooling system of claim 1, wherein the first magnet and the second magnet are rotated at a constant speed.

15. The magnetic cooling system of claim 1, wherein a rotational speed of the first magnet and the second magnet is 300 rpm or less.

16. The magnetic cooling system of claim 1, further comprising a pump that causes the heat transfer fluid to flow.

17. The magnetic cooling system of claim 16, wherein the pump moves the heat transfer fluid from a low-temperature section to a high-temperature section through the magnetic heat exchanger when the first magnet and the second magnet are moved to the magnetic heat exchanger and moves the heat transfer fluid from the high-temperature section to the low-temperature section through the magnetic heat exchanger when the first magnet and the second magnet are moved away from the magnetic heat exchanger.

* * * * *